United States Patent
Roustel et al.

(10) Patent No.: US 11,896,022 B2
(45) Date of Patent: Feb. 13, 2024

(54) INTERACTIONS BETWEEN CULTURES, COAGULANTS AND TECHNOLOGY TO INCREASE CHEESE YIELDS

(71) Applicant: Chr. Hansen A/S, Hoersholm (DK)

(72) Inventors: Sebastien Roustel, Hoersholm (DK); Véronique Jactat, Hoersholm (DK); Ulf Mortensen, Hoersholm (DK); Viviana Ester Bruno, Puerto Madero (AR); Michael Mitsuo Saito, Valinhos (BR)

(73) Assignee: Chr. Hansen A/S, Hoersholm (DK)

( * ) Notice: Subject to any disclaimer, the term of this patent is extended or adjusted under 35 U.S.C. 154(b) by 478 days.

(21) Appl. No.: 16/961,301

(22) PCT Filed: Jan. 10, 2019

(86) PCT No.: PCT/EP2019/050516
§ 371 (c)(1),
(2) Date: Jul. 10, 2020

(87) PCT Pub. No.: WO2019/137983
PCT Pub. Date: Jul. 18, 2019

(65) Prior Publication Data
US 2021/0076696 A1    Mar. 18, 2021

(30) Foreign Application Priority Data

Jan. 11, 2018 (EP) .................................... 18151126

(51) Int. Cl.
*A23C 19/068* (2006.01)
*A23C 19/032* (2006.01)

(52) U.S. Cl.
CPC ...... *A23C 19/0684* (2013.01); *A23C 19/0323* (2013.01)

(58) Field of Classification Search
CPC .................. A23C 19/0323; A23C 19/0684
(Continued)

(56) References Cited

U.S. PATENT DOCUMENTS

| 2008/0131557 A1 | 6/2008 | Isse et al. |
| 2014/0170276 A1 | 6/2014 | Nelles et al. |
| 2015/0140169 A1* | 5/2015 | Dekker ................ A23C 19/072 |
| | | 426/582 |

FOREIGN PATENT DOCUMENTS

| WO | WO-00/39281 | 7/2000 |
| WO | WO-2016/128476 | 8/2016 |

(Continued)

OTHER PUBLICATIONS

Cetaa, Diagramme de fabrication de Provolone, (1999).
(Continued)

*Primary Examiner* — Subbalakshmi Prakash
(74) *Attorney, Agent, or Firm* — Foley & Lardner LLP (57) ABSTRACT

The present invention relates to a process for making low-moisture mozzarella cheese using recent developments in the technical knowledge about the interactions between cultures, coagulants and cheese technology to increase cheese yields and maintain the cheese quality and functionalities. An optimization may lead to a higher pH and higher dry matter of the curd at the whey off step i.e. pH higher than 6.3 and ideally higher than 6.4 and solid non-fact content higher than 18%, without any modification of the curd composition at the stretching step, i.e. pH between 5.0 and 5.3 and more precisely between without any modification of the curd composition at the stretching step, i.e. pH between 5.0 and 5.3 and more precisely between 5.05 and 5.25, Ca/SNF between 1.7% and 2.4% and more precisely between 1.7 and 2.2%, dry matter between 53% and 55% and more precisely between 53.5% and 54.5%. The coagulant has a C/P ratio of at least 25. This optimization may also (Continued)

Flow chart to produce Mozzarella cheese using starter culture

Cow milk
↓
Standardization (casein/fat ratio or only fat content)
↓
Pasteurization
↓
Cooling to 35-37°C
↓
Addition of starter culture – Pre-matutation (hot maturation)
↓
Renneting
↓
Cooking of cheese curd (37°C to 42°C)
↓
Draining of whey
↓
Cheddaring of curd
↓
Desired pH at which curd will stretch in hot water
↓
Plasticizing
↓
Moulding into shaped
↓
Immersion in chilled brine
↓
Packaging and storage lead to a reduction in the processing time in the cheese vat (near 15%), so a real increase in the through-put and profitability of the cheese vats.

13 Claims, 6 Drawing Sheets

(58) Field of Classification Search
USPC .......................................................... 426/36
See application file for complete search history.

(56) References Cited

FOREIGN PATENT DOCUMENTS

| WO | WO-2017/111621 | 6/2017 | | |
|---|---|---|---|---|
| WO | WO-2017198829 A1 | * | 11/2017 | ............. A23C 19/04 |

OTHER PUBLICATIONS

Dave et al., "Influence of Coagulant Level on Proteolysis and Functionality of Mozzarella Cheeses Made Using Direct Acidification," J. Dairy Sci., vol. 86, pp. 114-126 (2003).
Dave et al., "Melt and rheological properties of mozzarella cheese as affected by starter culture and coagulating enzymes," Le Lait, vol. 83, No. 1, pp. 61-77 (2003).
El Owni et al., "Evaluation of Chemical Composition and Yield of Mozzarella Cheese Using Two Different Methods of Processing," Pakistan Journal of Nutrition, vol. 8, No. 5, pp. 684-687 (2009).
Gernigon et al., "Processing of Mozzarella cheese wheys and stretchwaters: A preliminary review," Dairy Science and Technology, vol. 90, pp. 27-46 (2010) (Published online Nov. 2009).
Guinee et al., "Effect of pH and Calcium Concentration on Some Textural and Functional Properties of Mozzarella Cheese," J. Dairy Sci., vol. 85, No. 7, pp. 1655-1669 (2002).
Guinee et al., "The suitability of milk from a spring-calved dairy herd during the transition from normal to very late lactation for the manufacture of low-moisture Mozzarella cheese," International of Dairy Journal, vol. 17 pp. 133-142 (2007).
Jana et al., "Manufacturing and Quality of Mozzarella Cheese: A Review," International Journal of Dairy Science, vol. 6, No. 4, pp. 199-226 (2011).
Joshi et al., "Understanding the Role of Calcium in Functionality of Part Skim Mozzarella Cheese," J. Dairy Sci. vol. 86, pp. 1918-1926 (2003).
Kindstedt et al., "Mozzarella Cheese: Impact of Coagulant Concentration on Chemical Composition Proteolysis and Functional Properties," J. Dairy Sci., vol. 78, No. 12, pp. 2591-2597 (1995).
Kindstedt et al., "Effect of Manufacturing Factors, Composition and Proteolysis on the Functional Characteristics of Mozzarella Cheese," Crit. Rev. Food Sci. Nutr., vol. 33, No. 2, pp. 167-187 (1993).
Kindstedt et al., "Recent Developments in the Science and Technology of Pizza Cheese," Aust. J. Dairy Technol., vol. 52, pp. 41-43 (Apr. 1997).
Kosikowski et al., Soft Italian Cheese—Mozzarella and Ricotta, Cheese and Fermented Milk Foods, 2nd edition, published by F.V. Kosikowski and Associates, pp. 181-184, ISBN 0-9602322-6-5 (1982).
Sales et al., "Relationship between mozzarella yield and milk composition, processing factors, and recovery of whey constituents," J. Dairy Sci., vol. 100, pp. 4308-4321 (2017).
Shaker et al., "Comparison of the quality of low moisture mozzarella cheese made from bovine, ovine and caprine milks," Journal of Food, Agriculture and Environment, vol. 10, No. 2, pp. 89-93 (Apr. 2012).
Sheehan et al., "Effect of coagulant type and storage temperature on the functionality of reduced-fat Mozzarella cheese," Le Lait, vol. 84 (6), pp. 551-566 (2004).
Yun et al., "Mozzarella Cheese: Impact of Coagulant Type on Chemical Composition and Proteolysis," J. Dairy Sci., vol. 76, No. 12, pp. 3648-3656 (1993).
Yun et al., "Mozzarella cheese: Impact of milling pH on chemical composition and proteolysis," J. Dairy Sci., vol. 76, No. 12, pp. 3629-3638 (1993).

* cited by examiner

Figure 1

Flow chart to produce Mozzarella cheese using starter culture

Figure 2: Flow diagram for the production of Mozzarella in literature using starter culture

Figure 4: Relative importance of draining and acidification rate during cheesemaking (Standard Mozzarella-LMMC and optimized process)

INTERACTIONS BETWEEN CULTURES, COAGULANTS AND TECHNOLOGY TO INCREASE CHEESE YIELDS

CROSS-REFERENCE TO RELATED APPLICATIONS

The present application is the U.S. National Stage of International Application PCT/EP2019/050516, filed Jan. 10, 2019, and claims priority to European Patent Application No. 18151126.2, filed Jan. 11, 2018.

FIELD OF THE INVENTION

Present invention relates to a process for making low moisture mozzarella cheese (hereinafter referred to as LMMC) which is a pasta-filata type cheese, meaning 'stretched curd'. This cheese type is a homogeneous cheese with firm or semi-firm texture without holes, suitable for grating.

According to CODEX standards, the strict appellation of mozzarella is reserved for cheeses with a fat in dry matter content higher than or equal to 45% and comprising a minimum of 45% dry matter content. In general, the percentage of total protein in a LMMC is greater than or equal to 23%. LMMC should not be confused with other types of mozzarella, for example with the mozzarella with high moisture content, which is a soft cheese with superposed layers capable of forming pockets containing liquid of milky appearance. This mozzarella can be packaged with or without liquid.

The previous definitions are derived from CODEX standards for mozzarella cheese (codex stan 262-2006, amended in 2006). Furthermore, in general, the LMMC disclosed in the literature may have a fat content higher than 23 and a moisture of 47%, while other types of mozzarella have lower amounts of fat content, such as 8-18%, and higher amounts of moisture, such as 53-57% [1].

The inventors of present disclosure use recent developments in the technical knowledge about the interactions between cultures, coagulants and cheese technology to increase cheese yields and maintain the cheese quality and functionalities (meltability, stretchability, slice ability, shred ability). More specifically, the present invention relates to a process for making LMMC which requires a rapid acidification (mainly by thermophilic starter culture or chemical acidification of the cheese milk) and a short time between the renneting and the milling steps.

This present invention relates to the management of the acidification rate independent of the level of drainage while maintaining or reducing the processing time. By optimizing these two kinetics, it is possible to reduce the protein and fat losses in the whey and therefore to increase the cheese yield while maintaining the cheese properties and functionalities.

This present invention is based on an optimization between culture, coagulant and technology to increase cheese yields by an improvement of acidification (pH) and draining (syneresis) curves.

BACKGROUND

Mozzarella cheese belongs to the cheese classified as "Pasta filata" which involves the principle of skillfully stretching the curd in hot water to get a smooth texture in the cheese. The cheese is white, unripened, and may be consumed shortly after manufacture. Its melting and stretching characteristics are highly appreciated in the manufacture of pizza as it is a key ingredient [2,5,6]. These two functional properties are critical for the cheese quality.

Figure 1:
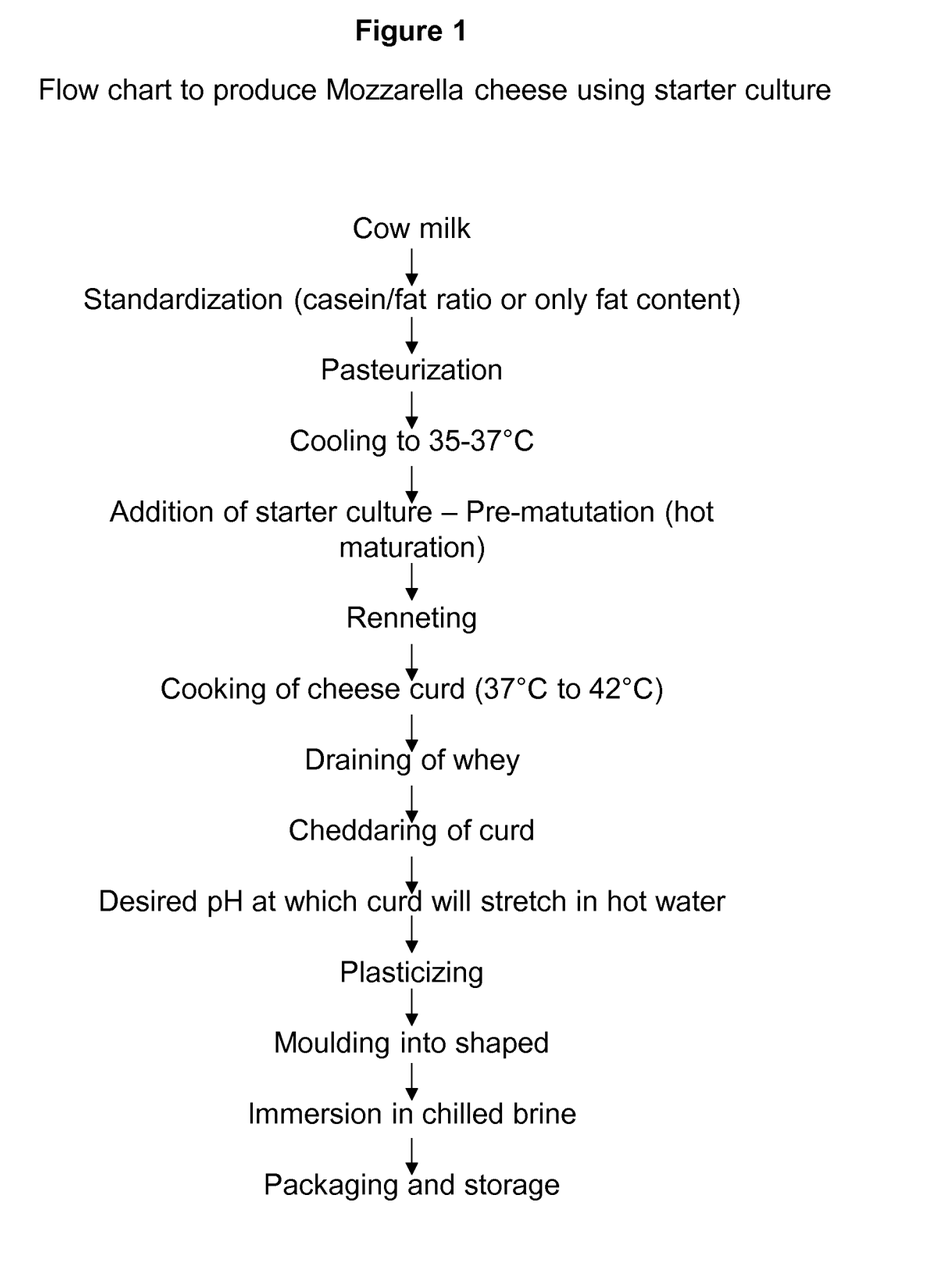
FIG. 1: Flow chart to produce low moisture mozzarella cheese (LMMC) using starter culture. This

The process used to manufacture mozzarella cheese varies considerably according to the market. This present invention is based only on the process using starter culture technique, i.e. traditional procedure. The direct acidification methods (citric acid, glucono-delta-lactone etc.) are not relevant for the invention. The traditional procedure to manufacture such a cheese is described by several authors [for example 2,7,13,14,16]. The flow chart for preparation of mozzarella cheese by starter culture method is depicted in FIG. 1.

Figure 2:
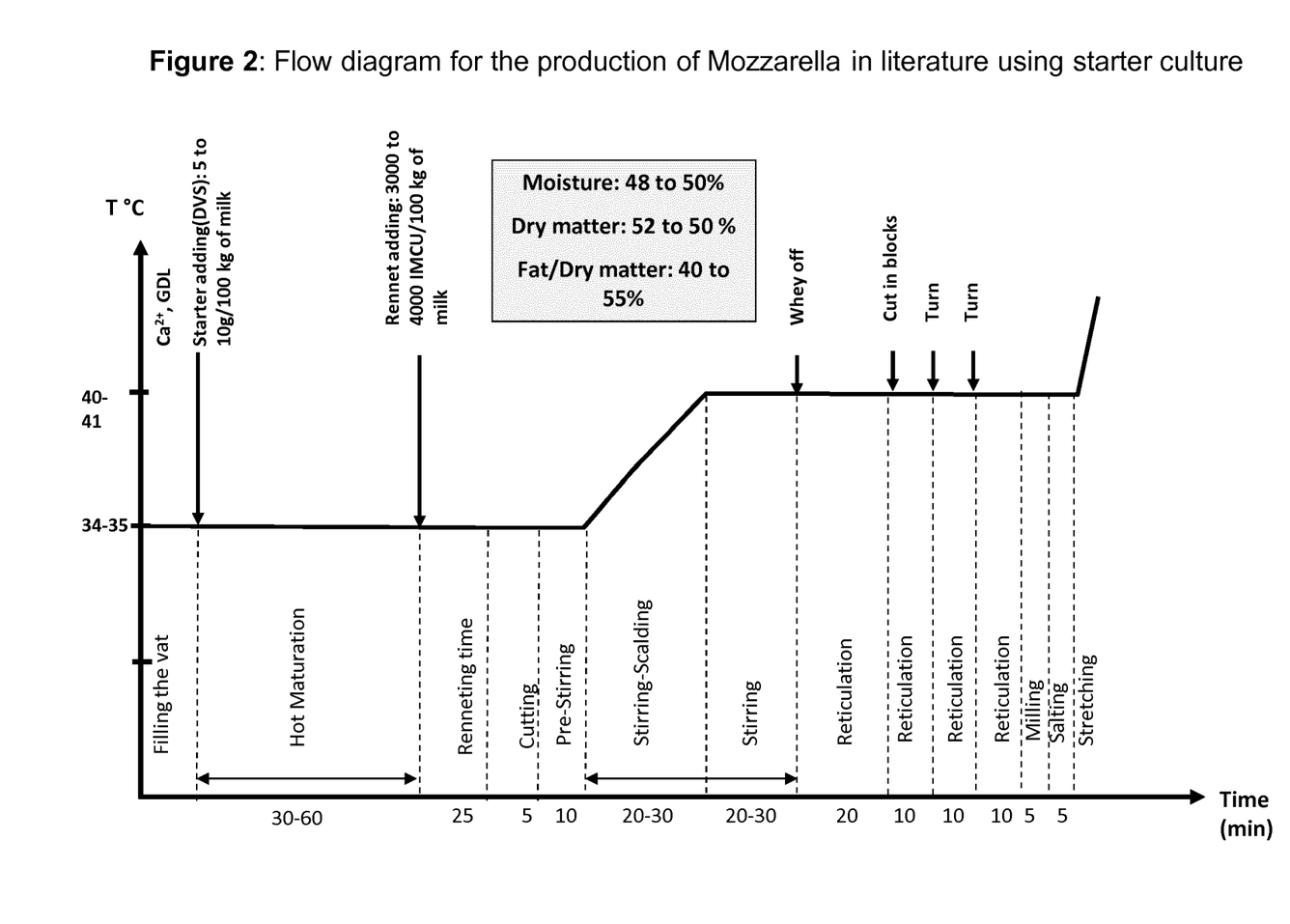
FIG. 2: Flow diagram for the production of LMMC described in literature using starter culture This

LMMC may be made with single culture of *Streptococcus thermophilus* or mixed culture of *Streptococcus thermophilus* and *Lactobacillus bulgaricus* or *Lactobacillus helveticus* [5,16]. When Direct Vat Starter (DVS) is used, the dosage varies from 5 g/100 kg to 10 g/100 kg of milk (according to the buffer capacity of the milk) and the hot maturation time is between 30 to 60 min [4,7,13,14] (FIG. 2). At the end of the hot maturation, the coagulant is added (e.g. 3000 to 3500 IMCU/100 kg of milk) to obtain the firmness target for cutting after 25 to 30 min [13,14,16]. The coagulant type and dosage is a key parameter for firmness but also for cheese functionalities. A high proteolytic coagulant activity leads to higher protein breakdown and therefore decreases the stretchability during long storage periods and changes the meltability [6,7,10]. So, it is very important to adjust the coagulant dosage according to the ratio of Clotting/Unspecific Proteolytic activity (i.e. C/P ratio) and the residual activity of the coagulant in the cheese to control the cheese functionalities.

For LMMC two main conditions are necessary for optimal stretching. Firstly, the curd must be sufficiently acidified (pH 5.3 to 5.0) and demineralized (Calcium/Solid Non-Fat: Ca/SNF of 1.7 to 2.4%) during cheese making to enable it to plasticise and stretch upon the application of heat [3,4,10,14]. Secondly, heat transfer during stretching must occur at a sufficient rate to transform the curd to a plastic flowable consistency before it is texturized.

Figure 3:
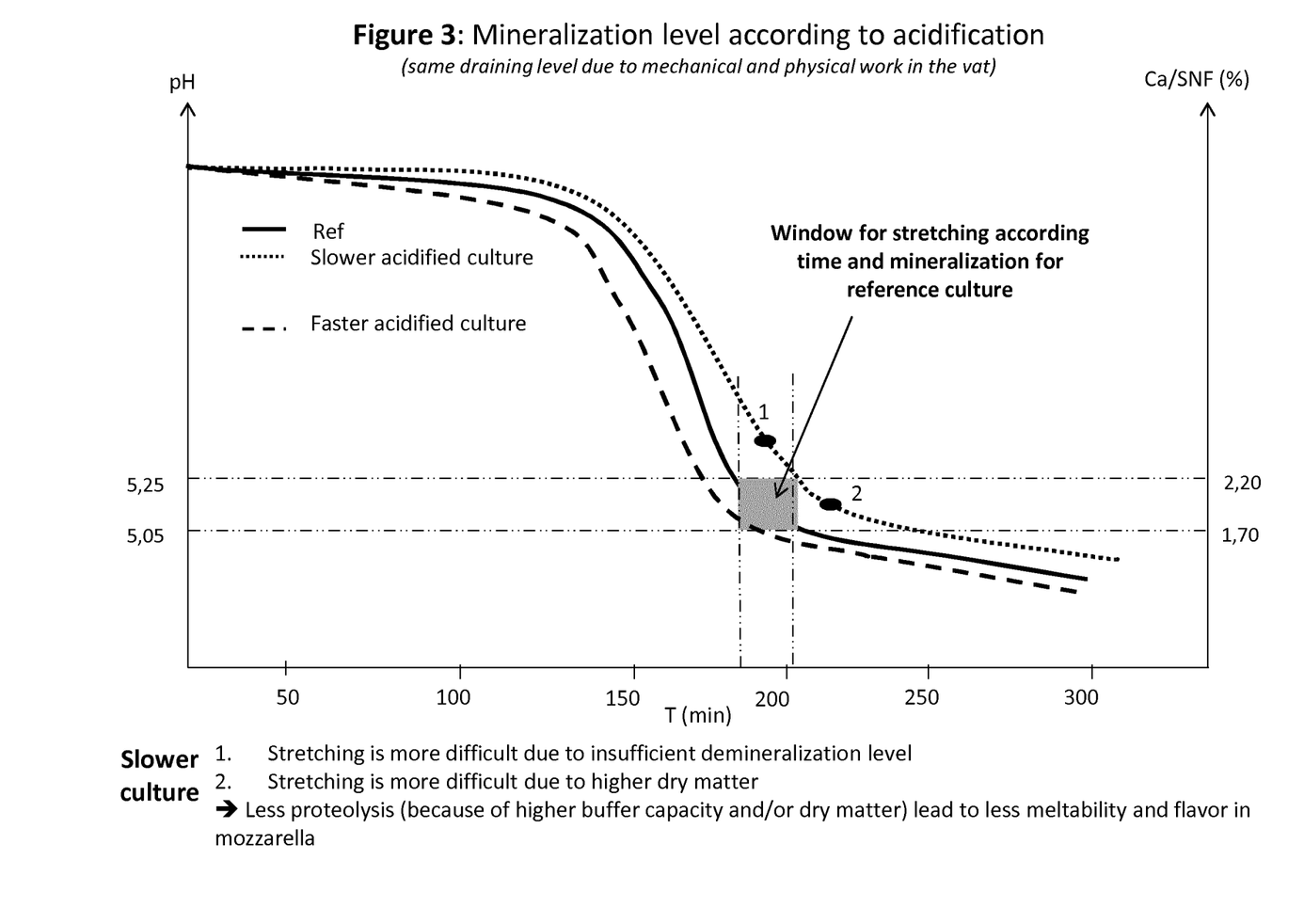
FIG. 3: Mineralization level according to acidification. This

For the first point, the acidification rate (pH decrease versus time) is very important. When starter cultures are used in this cheese technology, it is very important to obtain good acidification kinetics to obtain the desired mineralization target on time (FIG. 3) as the process is a continuous process for many factories. For LMMC, when cultures are used for the acidification, thermophilic starter cultures are commonly used (*Streptococcus thermophilus* and *Lactobacillus bulgaricus* or *Lactobacillus helveticus*), however mesophilic starters are also used in some countries. If the acidification is too slow, for the same processing time, the stretching is more difficult due to an insufficient level of demineralization. If the time to obtain the target pH is increased (i.e. level of demineralization), then the curd will be too dry for a good stretching and the cheese yield will be lower (FIG. 3). Moreover, a lower rate of acidification will result in lower levels of proteolysis (as the cheese will have a higher buffering capacity and/or dry matter will also be higher) and therefore reduce meltability and flavor development in mozzarella. So, the time window for optimum stretching is very narrow (FIG. 3).

From a technical point of view, it is also very important that the acidification kinetic is managed according to the draining kinetic to obtain a specific dry matter and level of curd demineralization before stretching. This level of mineralization is a very important requirement in order to obtain a good curd for stretching during the process [3,4,10,14]. As mozzarella cheese is used mostly for pizza applications and related foods, it must possess specific functional properties in both unmelted and melted states. Changes in functionality are a result of changes in the level of mineralization, pH, proteolysis, protein-bound water and free oil in the cheese [5,8,9,10,13,14]. So, the nature and type of the coagulant (clotting activity/unspecific proteolysis ratio) as well as the dosage and residual activity in the cheese are critical factors as well as the starter culture [8,10,13].

Figure 4:
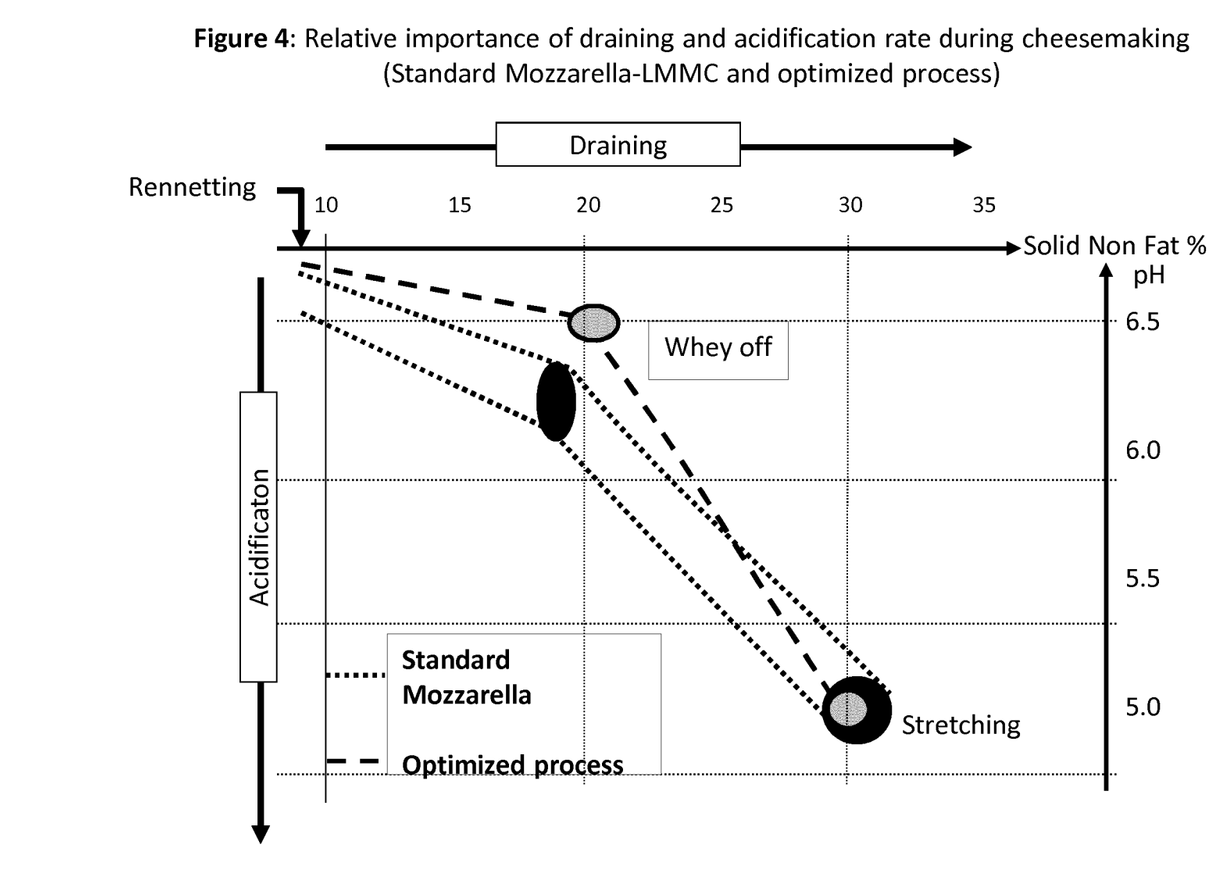
FIG. 4: Relative importance of draining and acidification rates during cheese making (Standard Mozzarella-LMMC and optimized process). This

In mozzarella processes, the kinetics of pH versus the kinetics of drainage are shown in FIG. 4. In this pathway, two critical points are shown (in black): whey off and stretching. At the whey off step, the pH of the curd is between 6.1 to 6.3 and the solid non-fat content is between 17% to 19%. At stretching, the pH of the curd is between 5.0 to 5.25 and the solid non-fat content is between 29% to 32%. By using the knowledge about the interactions between culture, enzyme and technology, it is possible to modify this pathway and preserve the cheese quality (composition, functional properties) with a shorter process time and higher cheese yield.

DETAILED DESCRIPTION OF THE INVENTION

The present invention is based on an optimization of the cultures (type and dosage), of the coagulant (type and dosage), and the technology in order to modify the acidification and drainage kinetics pathway without changing the composition of the curd at the point of stretching (FIG. 4).

This optimization leads to a higher pH and higher dry matter of the curd at the whey off step i.e. pH higher than 6.3 and ideally higher than 6.4 and solid non-fat content higher than 18%, without any modification of the curd composition at the stretching step, i.e. pH between 5.0 and 5.3 and more precisely between 5.05 and 5.25, Ca/SNF between 1.7% and 2.4% and more precisely between 1.7 and 2.2%, dry matter between 53% and 55% and more precisely between 53.5% and 54.5%.

This optimization also leads to a reduction in the processing time in the cheese vat (near 15%), so a real increase in the through-put and profitability of the cheese vats.

The present invention allows the skilled practitioner to:
reduce the protein and fat losses in the whey at the whey off step; for example, a reduction of the protein loss between 5 and 10% (i.e. from 0.95%/1.00% to 0.90%),
increase the amount of whey at the whey off step (more whey with lower protein and fat content),
reduce the amount of whey removal between whey off and stretching steps.

The present invention leads to an increase in the moisture adjusted cheese yield in the final cheese more than +0.8% comparatively to conventional LMMC process while preserving the functional properties of the cheeses; i.e. meltability, stretchability, slice ability and shred ability.

To obtain this new pathway and effect, the following adjustments were made:
higher pH at whey off step, in particular pH>6.30,
fast acidification rate after whey off,
higher syneresis at the whey step, in particular solid non-fat >18%,
shorter process time until curd stretching, in particular 15% faster.

This present invention is based on:
Suppression of the pre-maturation or warm maturation before the addition of the coagulant, namely, inoculation 5 min before renneting.
Inoculation with at least one thermophilic culture *Streptococcus thermophilus*, protease positive. The dosage of this culture is increased comparatively to the conventional practices (multiplied by between 1.3 and 1.7, and ideally 1.5). The combination of these parameters (*Streptococcus thermophilus*, protease positive, higher dosage and the suppression of the warm maturation) results in a low rate of acidification being obtained before the whey off step (to manage a higher pH at whey off) and a fast rate of acidification after whey off.

The use of a higher coagulant dosage comparatively to the conventional practices. The coagulant dose is multiplied between 1.1 and 1.7, and ideally 1.2, to increase the network organization speed and increase the rate of syneresis (to manage the higher solid non-fat content at the whey off step). At the same time, it is necessary to reduce the total coagulation time to cut the gel at the same firmness, i.e. total coagulation time between 15 to 20% shorter.

The use of a coagulant with a high Clotting/Unspecific Proteolytic activity ratio, i.e at least a C/P ratio 2.5 higher than standard calf rennet (e.g. C/P ratio of 25 in comparison to less than 10 for microbial coagulants), firstly to reduce the protein losses in the whey and secondly, to prevent the risk of higher proteolysis of the cheese during its conservation and therefore to prevent any degradation of the functional properties during shelf life.

The method used to measure the clotting activity (C) is based on the REMCAT measurement. The method used to measure the general proteolytic activity (P) of enzyme products against casein. The analysis is realized at pH=6.5. The desalted coagulant is incubated with casein (casein coupled with a yellow dye). During incubation (30° C. for 30 min), proteolytic enzyme will hydrolyse the casein and release peptides with dye coupled. The amount, measured by OD425, of TCA-soluble dye is used as a measure for enzyme activity. The result is expressed in mU (P) per 100 IMCU (C).

The use of a coagulant with a low thermal stability to reduce the residual coagulant activity in the cheese matrix during the shelf life and therefore to prevent any degradation of the functional properties. This thermal stability needs to be lower than 0.5% after a heat treatment at 68° C. during 1 min in the whey at pH=6, or all equivalent heat treatment.

Figure 5:
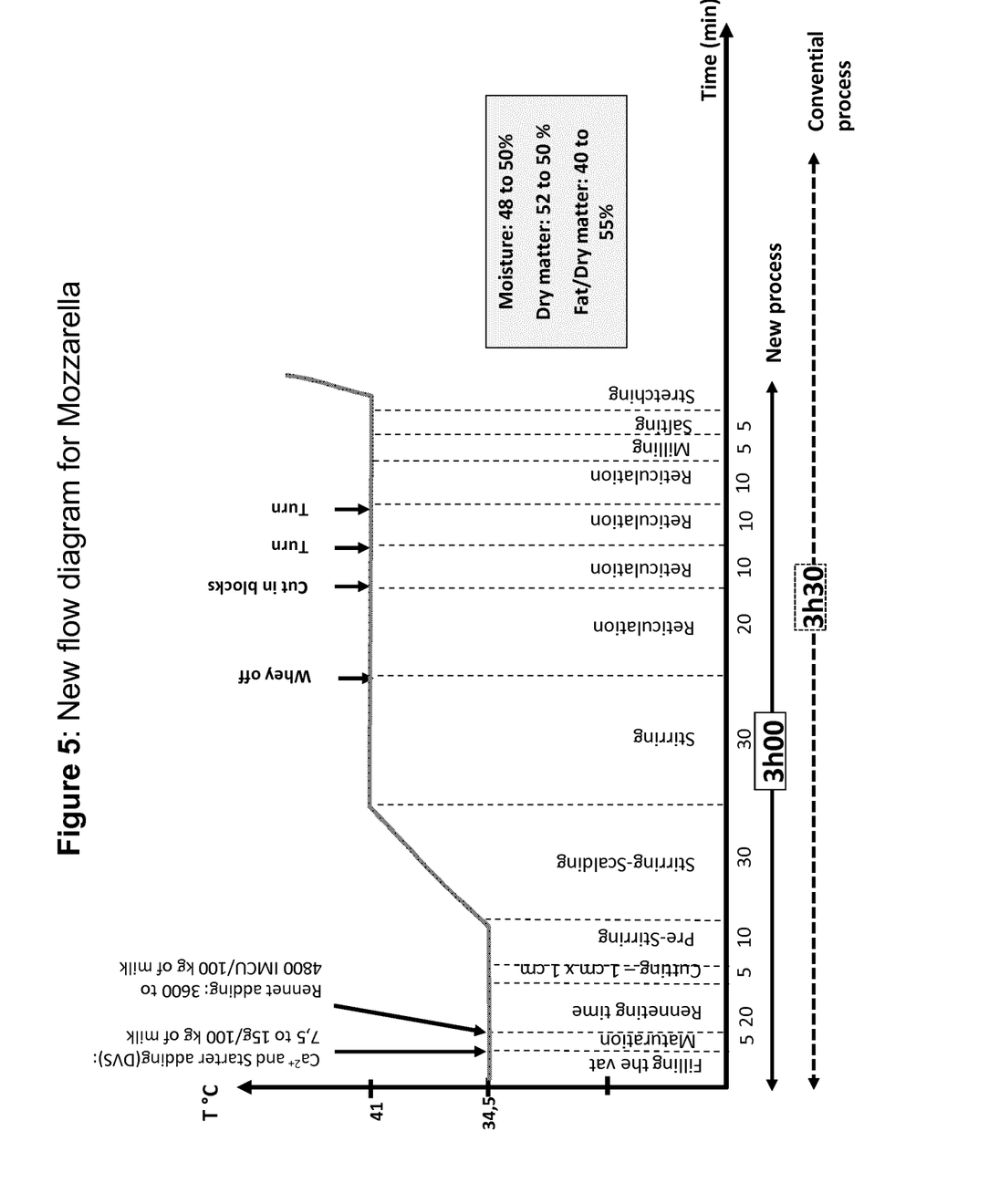
FIG. 5: New flow chart for Mozzarella. This

The present invention leads to a new flow diagram to produce Mozzarella cheese, FIG. 5, which give the same curd quality at the curd stretching step but with a shorter process time in cheese vat: 15% less time.

Otherwise, with the inoculation 5 min before renneting, the risk of phages is reduced. This is a key point to manage the quality of the curd demineralization for curd stretching step.

The meltability was evaluated according to the Schreiber method. This method compares the ability of cheeses to spread out during melting. This method consists in measuring the spreading for a sample of cylindrical cheese on a grid after heating at a set temperature and for a specific time (250° C. during 5 min).

The stretchability was evaluated using a "Filometer", a tool developed by Actalia (French Cheese institute). This tool measures the length of a cheese string obtained by pulling the heated cheese vertically using a harpoon before it breaks. The cheese (17 g) is placed in a well in a thermostatically controlled water bath held at 90° C. for 10 minutes.

By the term "milk" is understood a composition comprising lacteal secretion obtained from any mammal, such as an animal of a species belonging to the subfamily Bovinae (which includes the domestic cow (*Bos taurus*) and buffalo); an animal of a species belonging to the subfamily Caprinae (which includes goat and sheep); or an animal of the species Camelidae (which includes camels). Optionally the milk is acidified, e.g. by addition of an acid (such as citric, acetic or lactic acid) or by addition of an acid producing microorganism. The milk may be raw or processed, e.g. by filtering, sterilizing, pasteurizing, homogenizing, fractionating (e.g. reducing the fat content of the milk) etc., or it may be reconstituted dried milk. An important example of "milk" according to the present invention is pasteurized cow's milk. It is understood that the milk may be acidified, mixed or processed before, during and/or after the adding of bacterial cultures. The term "milk" also comprises milk with protein, calcium or other additives added.

By the term "starter culture" is understood at least one bacterial culture able to acidify the milk according to general practice in the cheese making industry. Preferably the starter comprises at least one protease positive *Streptococcus thermophilus*.

By the term "coagulant" is intended to mean any coagulant, preferably a chymosin such as e.g. a chymosin of bovine or camel origin. Accordingly, a coagulant may be a genetically modified variant of a parent chymosin.

To further describe the invention, preferred aspects and combinations thereof are summarized as interrelated aspects below:

Aspect 1. A process for making a low moisture mozzarella cheese (LMMC), the process comprising the following steps:
A) adding to milk, a starter culture and optionally calcium, to obtain a composition
B) adding one or more coagulants to the composition of step A,
C) renneting the composition of step B for between 5 minutes and 25 minutes to obtain a renneted firmness
D) cutting the renneted composition of step C
E) stirring and scalding the composition of step D while heating the composition to around 41° C.
F) optionally stirring the composition
G) removing the whey part to obtain a curd, and
H) performing required steps to obtain a low moisture mozzarella cheese, wherein the one or more coagulants are added no later than 10 minutes, preferably 5 minutes, after addition of the starter culture and wherein pH is at least 6.3, preferably between 6.35 and 6.45, before removing the whey in step G, and preferably wherein the one or more coagulants have a C/P ratio of at least 25.

Aspect 2. The process according to aspect 1, wherein the required steps to obtain a low moisture mozzarella cheese (LMMC) in step H comprises one or more of the following steps:
I) reticulating the curd of step G
J) cutting the curd of step H
K) optionally reticulating the curd
L) milling the curd
M) salting the curd and/or
N) stretching the curd.

Aspect 3. The process according to aspect 1 or 2, where the starter culture is added in step A in an amount from 7.5 g to 15 g per or 7.5 units to 15 units per 100 liters of milk.

Aspect 4. The process according to any of aspects 1-3 wherein the starter culture is added as frozen or freeze-dried pellets, such as e.g. as a direct vat set (DVS) culture.

Aspect 5. A process according to any of the preceding aspects, wherein the starter culture comprises at least one protease positive *Streptococcus thermophilus* strain and optionally at least one *Lactobacillus bulgaricus* and/or *Lactobacillus helveticus* strain.

Aspect 6. The process according to any of the preceding aspects, wherein the coagulant is a chymosin, such as e.g. a camel chymosin or a chymosin derived from camel or bovine origin.

Aspect 7. The process according to any of the preceding aspects, wherein the coagulant is a genetically modified chymosin, such as e.g. a genetically modified variant derived from a parent polypeptide of camel or bovine origin.

Aspect 8. The process according to any of the preceding aspects, wherein the coagulant has a C/P ratio of at least 25, or preferably at least 30, or more preferably at least 35, or even more preferably the coagulant has a C/P ratio of at least 40.

Aspect 9. The process according to any of the preceding aspects, wherein the coagulant is added in an amount of 3740 to 5780 IMCU per 100 kg of milk, or preferably 4000 to 5000 IMCU per 100 kg of milk, or more preferably 4080 IMCU per 100 kg of milk.

Aspect 10. The process according to any of the preceding aspects, wherein pH is at least 6.6 in step C, preferably between 6.6 to 6.65.

Aspect 11. The process according to any of the preceding aspects, wherein the rennet is added in an amount of 3600 to 4800 IMCU per 100 kg of milk.

Aspect 12. The process according to any of the preceding aspects, wherein the low moisture mozzarella cheese has a moisture content of 48% to 50% measured no later than 24 hours after cutting the renneted composition in step D.

Aspect 13. The process according to any of the preceding aspects, wherein the low moisture mozzarella cheese has a dry matter content of 50% to 52% measured no later than 24 hours after cutting the renneted composition in step D.

Aspect 14. The process according to any of the preceding aspects, wherein the low moisture mozzarella cheese has a fat per dry matter ratio of 0.40 to 0.55 measured no later than 24 hours after cutting the renneted composition in step D.

Aspect 15. A low moisture mozzarella cheese (LMMC) obtained by the process of any of the preceding aspects.

Aspect 16. The low moisture mozzarella cheese (LMMC) according to aspect 15, with a stretchability of at least 1000 after 30 days, preferably at least 1200 after 30 days.

Aspect 17. The low moisture mozzarella cheese (LMMC) according to aspect 15, with a stretchability of at least 1000 after 60 days, preferably at least 1200 after 60 days.

Aspect 18. The low moisture mozzarella cheese (LMMC) according to any of aspects 15 to 17, with a ratio between soluble nitrogen and total nitrogen (SN/TN) is at least 3.7 eight days after production, 4.7 1 month after production, or 7.2 2 months after production.

Aspect 19. The cheese according to any of aspects 15 to 18, wherein the cheese has a moisture content of 48% to 50% measured no later than 24 hours after cutting the renneted composition in step D.

Aspect 20. The cheese according to any of aspects 15 to 19, wherein the low moisture mozzarella cheese has a dry matter content of 50% to 52% measured no later than 24 hours after cutting.

Aspect 21. The cheese according to any of aspects 15 to 20, wherein the low moisture mozzarella cheese has a fat per dry matter ratio of 0.40 to 0.55 measured no later than 24 hours after cutting the renneted composition in step D.

DESCRIPTION OF THE FIGURES

FIG. 1 represents in a schematic way the various steps used during the manufacture of mozzarella at industrial scale.

FIG. 2 shows the time line and temperature profile of the various steps used during the manufacture of mozzarella with some technical parameters i.e. culture dosage, coagulant dosage, time of each step.

FIG. 3 is a graph showing the evolution of pH and level of mineralization (expressed as the ratio of calcium to solid non-fat) as a function of time, in order to produce a curd ready for stretching. This graph shows that the optimal window to obtain a good curd stretching ability is narrow (grey area).

FIG. 4 is a graph showing the acidification and draining pathways of the curd during mozzarella cheese making between pre-maturing and stretching steps, for a standard and optimized process. This graph shows than the first critical point (at whey off) with the optimized process (in grey) does not present the same characteristics as the standard process (in black) but that the second critical points (at stretching) are similar. The horizontal axis represents the syneresis or drainage of the curd, expressed by the percentage of solid non-fat.

FIG. 5 shows the time line and temperature profile of the various steps used during the optimized process to produce mozzarella. This figure shows also the time difference between both process (conventional and optimized process).

EXAMPLES

All examples were performed in triplicate to increase the robustness of the data.

Example 1—Conventional Cheesemaking Microbial Coagulant, Low C/P Ratio (Hannilase®)

This first example is a conventional mozzarella cheese making according to the literature and industrial recipes were used (flow charts described in FIGS. 1 and 2). For this first example, the starter culture used was STi06 from Chr-Hansen® (Denmark) and the coagulant was Hannilase® XP200 from Chr-Hansen® (Denmark). This coagulant has a C/P ratio of 6.5. The culture dosage was 6.7 g/100 kg of milk and the coagulant dosage was 3400 IMCU per 100 kg of milk. The milk composition is shown in tab 1.

The hot maturation step was 60 min and the firmness at cutting was monitored by the Hansen-CHYMOGRAPH®, the firmness index at cutting was 6.5.

After cutting, the curd was pre-stirred for 10 minutes before scalding at 41° C. The scalding took 30 min and after the curd was stirred for 20 min before the whey off step, so 60 min in total between cutting and whey off. The pH of the curd at whey-off was between 6.20 and 6.30 and the solid non-fat content was equal to 17.5% (±0.6), Tab 1. After, the curd was formed into blocks and turned 3 times before milling. The pH at milling was 5.15 (±0.02). After the milling, the curd was salted with dry salt before stretching and cheese cooling.

At day 1, a cheese sample was analyzed for composition to determine the moisture adjusted cheese yield and the recovery coefficients (fat and protein).

With this example 1, the moisture adjusted cheese yield was 10.47 (±0.01) kg of cheese per 100 kg of milk, the fat recovery was 86.8% (±0.7), and the protein recovery was 75.9% (±0.6). The protein losses in the whey (whey at whey off and whey before stretching) are shown in tab 2.

After 30 and 60 days of storage (at 4° C.), the functional properties (meltability and stretchability) were measured. Indices of proteolysis were measured at 8, 30 and 60 days (total soluble nitrogen/total nitrogen). The values are reported in tab 3 and FIG. 6.

The total make time for example 1 (from culture addition to stretching was 3 h 34 min), as shown in tab 4.

Example 2—Conventional Cheese Making FPC Coagulant High C/P Ratio (CHY-MAX M®)

This second example is also a conventional mozzarella cheese making as in example 1, but with a different coagulant: CHY-MAX-M®. This Coagulant has a higher C/P ratio, i.e. 40 versus 6.5 for Hannilase XP®. For this second example, the starter culture used was the same as in example 1, i.e. STi06 from Chr-Hansen® (Denmark) added at 6.7 g/100 kg of milk. The CHY-MAX-M dosage was 3400 IMCU per 100 kg of milk. The milk composition was exactly the same as in example 1 (tab 1).

The hot maturation step was 60 min and the firmness at cutting was monitored by the Hansen-CHYMOGRAPH®, the firmness index at cutting was 6.5. This firmness index was obtained 7 min faster than with Hannilase® XP, due to the specificity of this coagulant.

The other cheese making parameters were identical to those used in example 1 (Tab 4).

The pH of the curd at whey-off was between 6.30 and 6.20 and the solid non-fat content was equal to 17.6% (±0.5), Tab 1.

In this example 2, the moisture adjusted cheese yield was 10.53 kg of cheese per 100 kg of milk, the fat recovery was 87.7% (±0.6), and the protein recovery was 76.8% (±0.7). The protein losses in the whey (whey at whey off and whey before stretching) are shown in tab 2. CHY-MAX M resulted in lower protein losses in the whey.

This example 2 shows that with the use of a coagulant having a higher C/P ratio, in the conventional process that it is possible to increase the moisture adjusted cheese yield by about 0.6% in comparison to Hannilase® XP.

After 30 and 60 days of storage (at 4° C.), the functional properties (meltability and stretchability) were measured. Indices of proteolysis were measured at 8, 30 and 60 days (total soluble nitrogen/total nitrogen). The values are reported in tab 3 and FIG. 6.

Figure 6:
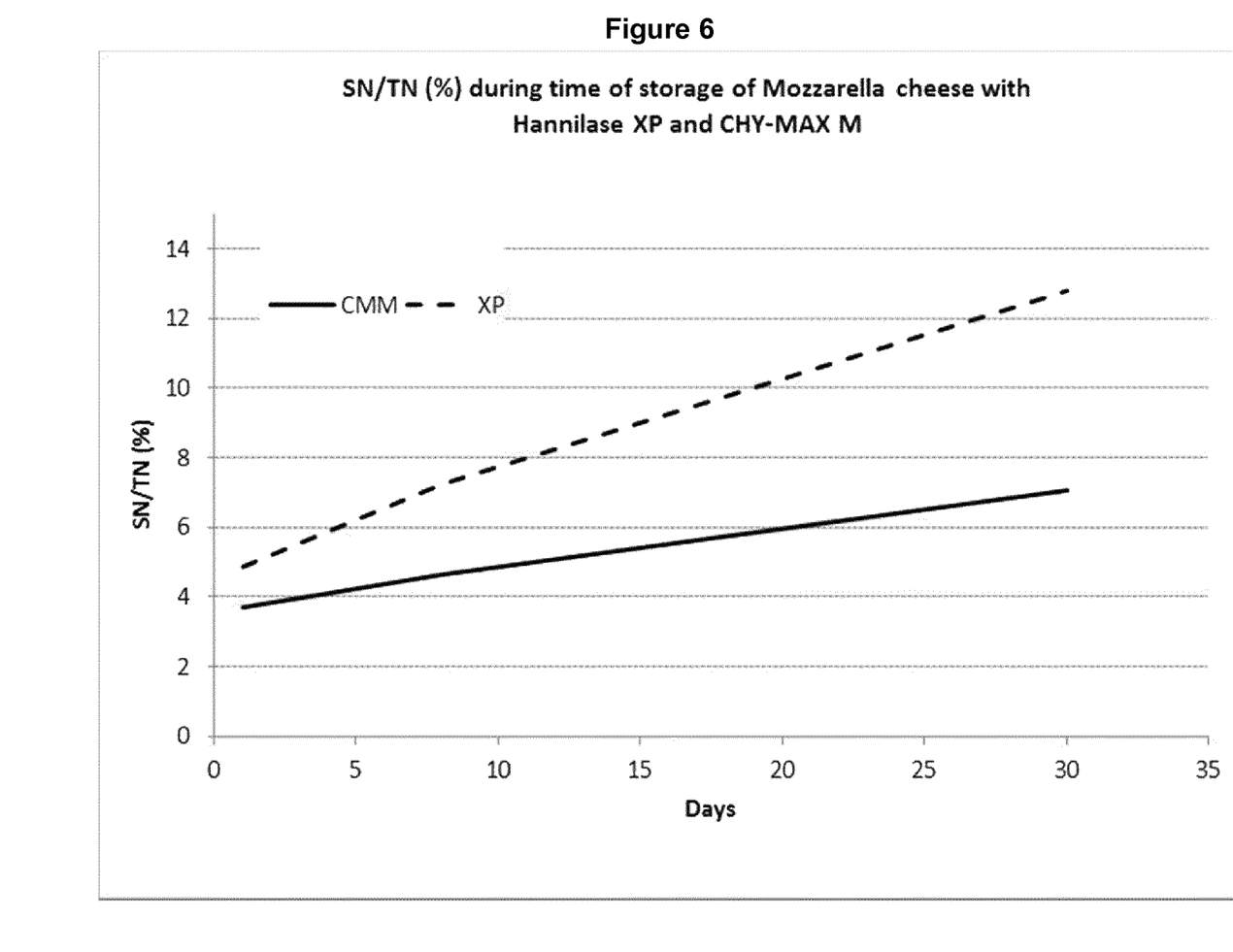
FIG. 6: SN/TN (%) during storage time of mozzarella cheese produced with Hannilase® and CHY-MAX-M®. This graph shows the evolution of primary proteolysis (soluble nitrogen/total nitrogen content) calculated from Kjeldahl analysis of mozzarella produced with the conventional process.

The graph shows that the use of CHY-MAX M (coagulant with a higher C.P. ratio) leads to lower levels of protein breakdown in comparison to that obtained when Hannilase® XP is used without any significant difference in the meltability and stretchability obtained at days +30 and +60.

The total make time for example 2 (from culture addition to stretching was 3 h 28 min) was close to example 1, as shown in tab 4.

Example 3—Optimized Process with a Microbial Coagulant Having a Low C/P Ratio

This example 3 uses an optimized process, i.e. same culture with higher dosage (than examples 1 and 2), higher dosage of coagulant than examples 1 and 2 (4080 IMCU/100 kg of milk versus 3400 for examples 1 and 2) and only 5 min for the "hot maturation" step versus 60 min in examples 1 and 2. The milk composition was close to examples 1 and 2 (tab 1). Only the pH at renneting was higher in order to optimize the acidification versus syneresis rates (6.65 to 6.60 versus 6.60 to 6.55).

This example 3 used the same coagulant as in example 1, i.e. Hannilase® XP200 and the firmness index at cutting was the same (Firmness index=6.5). This firmness index was obtained 1 min later than in example 1, due to the higher pH at renneting.

The other parameters of the cheese making were identical to examples 1 and 2, except the final stirring time, which was 10 minutes longer to manage the dry matter target at stretching (Tab 4).

With this optimized process, the pH of the curd at whey-off was between 6.45 and 6.35 and the solid non-fat content was equal to 19.1% (±0.7) Tab 1.

In this example 3, the moisture adjusted cheese yield was 10.50 kg of cheese per 100 kg of milk, the fat recovery was 86.7% (±0.7), and the protein recovery was 77.0% (±0.7). The protein losses in the whey (whey at whey off and whey before stretching) are shown in the tab 2. The protein losses are close to those obtained in example 1 (same coagulant with low C/P ratio).

This example 3 shows that with the optimized process and the use of a coagulant having a low C/P ratio (6.5 in this case), it is possible to increase the moisture adjusted cheese yield by about 0.3% only.

After 30 and 60 days of storage (at 4° C.), the functional properties (meltability and stretchability) were measured. Indices of proteolysis were measured at 8, 30 and 60 days (total soluble nitrogen/total nitrogen). The values are reported in tab 3.

The table shows that with this optimized process and the use of coagulant having a low C/P ratio that the meltability property is a little higher than that obtained using the conventional process but at the same time, the stretchability decreased (a consequence of higher protein breakdown).

The total make time for example 3 (from culture addition to stretching was 3 h 01 min) which was 33 minutes shorter than example 1, as shown in tab 4.

Example 4—Optimized Process with a Coagulant Having a High C/P Ratio

This example 4 used an optimized process, i.e. same culture with higher dosage (than examples 1 and 2), higher dosage of coagulant than examples 1 and 2 (4080 IMCU/100 kg of milk versus 3400 for examples 1 and 2) and only 5 min for the "hot maturation" step versus 60 min in examples 1 and 2. The milk composition was the same as in example 3 and close to examples 1 and 2 (tab 1). As in example 3, the pH at renneting was higher than examples 1 and 2 to optimize the acidification versus syneresis rates (6.65 to 6.60 versus 6.60 to 6.55).

This example 4 used the same coagulant as in example 2, i.e. CHY-MAX M and the firmness index at cutting was the same (Firmness index=6.5). This firmness index was obtained 3 min later than example 2, due to the higher pH at renneting.

The other parameters of the cheese making were identical to examples 1 and 2, except the final stirring time which was 10 minutes longer to obtain the target dry matter at stretching (Tab 4). Therefore the stirring time was the same as in example 3.

With this optimized process, the pH of the curd at whey-off was between 6.45 and 6.35 and the solid non-fat content was equal to 19.0% (±0.6) Tab 1.

With this example 4, the moisture adjusted cheese yield was 10.65 kg of cheese per 100 kg of milk, the fat recovery was 88.3% (±0.6), and the protein recovery was 77.3% (±0.7). The protein losses are less than the three other examples.

This example 4 shows that with the optimized process and the use of a coagulant having a high C/P ratio (40 in this case), that it is possible to increase the moisture adjusted cheese yield by about 1.7% in comparison to example 1 and 1.1% in comparison to example 2 and 1.4% in comparison to example 3.

After 30 and 60 days of storage (at 4° C.), the functional properties (meltability and stretchability) were measured. Indices of proteolysis were measured at 8, 30 and 60 days (total soluble nitrogen/total nitrogen). The values are reported in tab 3.

The table shows that with this optimized process and the use of a coagulant having a high C/P ratio it is possible to preserve these two functional properties.

The total make time for example 4 (from culture addition to stretching was 2 h 57 min) was 30 minutes shorter than examples 1 and 2, as shown in tab 4.

TABLE 1

| Parameters | Conventional process | | Optimized process | |
|---|---|---|---|---|
| Fat in milk | 2.40-2.45 | | 2.38-2.44 | |
| Protein in milk | 3.45-3.50 | | 3.41-3.48 | |
| Fat/protein | 0.70 | | 0.70 | |
| pH at renneting | 6.60-6.55 | | 6.65-6.60 | |
| pH at whey off | 6.30-6.20 | | 6.45-6.35 | |
| pH at milling | 5.15 | | 5.15 | |
| Coagulant | Hannilase XP | CHY-MAX-M | Hannilase XP | CHY-MAX-M |
| Dosage of coagulant (IMCU/100 kg of milk) | 3400 | 3400 | 4080 | 4080 |
| Culture (Type/dosage g per 100 kg of milk) | Sti06/6.7 g | Sti06/6.7 g | Sti06/10 g | Sti06/10 g |
| Solid No Fat at whey off (%) | 17.5 (±0.6) | 17.6 (±0.5) | 19.1 (±0.7) | 19.0 (±0.6) |

TABLE 2

| Parameters | Conventional process | | Optimized process | |
|---|---|---|---|---|
| | Hannilase XP | CHY-MAX-M | Hannilase XP | CHY-MAX-M |
| Coagulant | Hannilase XP | CHY-MAX-M | Hannilase XP | CHY-MAX-M |
| Dosage of coagulant (IMCU/100 kg of milk) | 3400 | 3400 | 4080 | 4080 |
| Culture (Type/dosage g per 100 kg of milk) | Sti06/6.7 g | Sti06/6.7 g | Sti06/10 g | Sti06/10 g |
| Protein in the whey at whey off | 0.99 | 0.95 | 0.97 | 0.90 |
| Protein in whey before stretching | 1.66 | 1.16 | 1.50 | 1.09 |
| Moisture adjusted yield (kg cheese/100 kg milk) | 10.47 | 10.53 | 10.5 | 10.65 |
| Fat recovery | 86.8 (±0.7) | 87.7 (±0.6) | 86.7 (±0.7) | 88.3 (±0.6) |
| Protein recovey | 75.9 (±0.6) | 76.8 (±0.7) | 77.0 (±0.7) | 77.3 (±0.7) |

TABLE 3

| Parameters | Conventional process | | Optimized process | |
|---|---|---|---|---|
| | Hannilase XP | CHY-MAX-M | Hannilase XP | CHY-MAX-M |
| Coagulant | Hannilase XP | CHY-MAX-M | Hannilase XP | CHY-MAX-M |
| Dosage of coagulant (IMCU/100 kg of milk) | 3400 | 3400 | 4080 | 4080 |
| Culture (Type/dosage g per 100 kg of milk) | Sti06/6.7 g | Sti06/6.7 g | Sti06/10 g | Sti06/10 g |
| Stretch-ability after 30 days (mm) | >1200 | >1200 | >1200 | >1200 |
| Stretch-ability after 60 days (mm) | >1200 | >1200 | 1100 | >1200 |
| Melt-ability after 30 days | 4.1 (±0.2) | 3.9 (±0.2) | 4.2 (±0.2) | 3.8 (±0.2) |
| Melt-ability after 60 days | 4 (±0.2) | 4 (±0.2) | 4.3 (±0.2) | 3.9 (±0.2) |
| SN/TN day 8 | 4.9 | 3.7 | 5.2 | 3.8 |
| SN/TN day 30 | 7.2 | 4.7 | 7.5 | 4.8 |
| SN/TN day 60 | 12.8 | 7 | 13.2 | 7.2 |

TABLE 4

| Process steps/time (min) | Example 1 | Example 2 | Example 3 | Example 4 |
|---|---|---|---|---|
| Pre-fermentation | 60 | 60 | 15 | 15 |
| Rennet time | 29 | 22 | 30 | 25 |
| Cutting | 5 | 5 | 5 | 5 |
| Pre-stirring | 10 | 10 | 10 | 10 |
| Whey off 1 | 0 | 0 | 0 | 0 |
| Middle stirring | 0 | 0 | 0 | 0 |
| Scald time | 30 | 30 | 30 | 30 |
| Final stirring | 20 | 20 | 30 | 30 |
| Whey off 2 | 20 | 20 | 20 | 20 |
| Cut in blocks | 10 | 10 | 10 | 10 |
| 2. turn | 10 | 10 | 10 | 10 |
| 3. turn | 10 | 11 | 11 | 12 |
| Milling | 5 | 5 | 5 | 5 |
| Add. of salt before Stretching | 5 | 5 | 5 | 5 |
| Total time (min) | 214 | 208 | 181 | 177 |

REFERENCES

[1] Kosikowski, F., 1982. Cheese and Fermented Milk Foods, 2$^{nd}$ edition, published by F. V. Kosikowski and Associates, pages 181-184, ISBN 0-9602322-6-5.

[2] El-Owni, O. A. O. and S. E. Osman, 2009. Evaluation of chemical composition and yield of mozzarella cheese using two different methods of processing. Pak. J. Nutr., 8: 684-687.

[3] Joshi, N. S. Muthukumarappan, K. and Dave, R. I., Understanding the role of calcium in functionality of part skim mozzarella cheese, Journal of dairy science, vol. 86:1918-1926, 2003.

[4] Guinee, T. P. and al, Effect of pH and calcium concentration on some textural and functional Properties of Mozzarella Cheese, Journal of dairy science, vol. 85, no 7, 2002, pages 1655-1669. ISSN 0022-0302/DOI: 10.3168.

[5] Jana, A. H. and Mandal, P. K., Manufacturing and quality of Mozzarella cheese: A review, International Journal of Dairy Science 6 (4), 2011, pages 199-226. ISSN 1811-9743/DOI: 10.3923.

[6] Dave, R. I., D. J. McMahon, C. J. Oberg and J. R. Broadbent, 2003. Influence of coagulant level on proteolysis and functionality of mozzarella cheeses made using direct acidification. J. Dairy Sci., 86: 114-126.

[7] Dave, R. I., P. Sharma and D. J. McMahon, 2003. Melt and rheological properties of mozzarella cheese as affected by starter culture and coagulating enzymes. Lait, 83: 61-77.

[8] Sheehan, J. J., O'Sullivan, K., P. Guinee, T., 2004. Effect of coagulant type and storage temperature on the functionality of reduced-fat Mozzarella cheese. Lait 84: 551-566.S.

[9] Kindstedt, P. S., 1993. Effect of manufacturing factors, composition and proteolysis on the functional characteristics of mozzarella cheese. Crit. Rev. Food Sci. Nutr., 33: 167-187.

[10] Kindstedt, P. S., J. J. Yun, D. M. Barbano and K. L. Larsoe, 1995. Mozzarella cheese: Impact of coagulant concentration on chemical composition proteolysis and functional properties. J. Dairy Sci., 78: 2591-2597.

[11] Kindstedt, P. S. and M. R. Guo, 1997. Recent developments in the science and technology of pizza cheese. Aust. J. Dairy Technol., 52: 41-43.

[12] Sales, D. C., Rangel, A. H. N., Urbano, S. A., Freitas, A. R., Tonhati, H., Novaes, L. P., Pereira, M. I. B., Borbas, L. H. F., 2016. Relationship between mozzarella yield and milk composition, processing factors, and recovery of whey constutuents. J. Dairy Sci. 100: 4308-4321.

[13] Yun, J. J., D. M. Barbano and P. S. Kindstedt, 1993. Mozzarella cheese: Impact of coagulant type on chemical composition and proteolysis. J. Dairy Sci., 76: 3648-3654.

[14] Yun, J. J., D. M. Barbano and P. S. Kindstedt, 1993. Mozzarella cheese: Impact of milling pH on chemical composition and proteolysis. J. Dairy Sci., 76: 3629-3638.

[15] CETAA, Diagramme de fabrication de Provolone, 1999.
[16] Gernigon, G., Schuck, P., Jeantet, R., Processing of mozzarella cheese wheys and stretchwater: A preliminary review, Dairy Science and Technology, Vol. 90, 27-46, 2010. DOI: 10.1051/dst/2009045.

The invention claimed is:

1. A process for making a low moisture mozzarella cheese (LMMC), comprising:
  A) adding to milk, a starter culture and, optionally, calcium, to obtain a composition;
  B) adding one or more coagulants to the composition of step A;
  C) renneting the composition of step B for 5 minutes to 25 minutes to obtain a renneted composition;
  D) cutting the renneted composition of step C;
  E) stirring and scalding the composition of step D while heating the composition to around 41° C.;
  F) optionally stirring the composition; and
  G) removing whey to obtain a curd
  wherein step B of adding one or more coagulants to the composition is conducted no later than 10 minutes, after step A of adding the starter culture to milk,
  wherein the pH of the composition is at least 6.3 before step G of removing whey,
  wherein the one or more coagulants have a clotting activity/unspecific proteolytic activity (C/P) ratio of at least 25, and
  wherein the low moisture mozzarella cheese has one or more of (i) a moisture content of 48% to 50% when measured no later than 24 hours after step D of cutting the renneted composition; (ii) a dry matter content of 50% to 52% when measured no later than 24 hours after step D of cutting the renneted composition; and (iii) a fat per dry matter ratio of 0.40 to 0.55 when measured no later than 24 hours after step D of cutting the renneted composition.

2. The process according to claim 1, further comprising, after step G, one or more of the following:
  reticulating the curd of step G;
  cutting the curd of step G;
  optionally reticulating the curd a second time;
  milling the curd;
  salting the curd, and
  stretching the curd.

3. The process according to claim 1, wherein in step A the starter culture is added in an amount from 7.5 g to 15 g per 100 liters of milk.

4. The process according to claim 1, wherein the starter culture is added as frozen or freeze-dried pellets.

5. The process according to claim 1, wherein the starter culture comprises at least one protease positive *Streptococcus thermophilus* strain and optionally one or more of at least one *Lactobacillus bulgaricus* and at least one *Lactobacillus helveticus* strain.

6. The process according to claim 1, wherein the coagulant is a chymosin of camel or bovine origin.

7. The process according to claim 1, wherein the coagulant has a C/P ratio of at least 30.

8. The process according to claim 1, wherein the coagulant is added in an amount of 3740 to 5780 IMCU per 100 kg of milk.

9. The process according to claim 1, wherein the pH of the composition at step C is at least 6.6.

10. The process according to claim 1, wherein the rennet is added in an amount of 3600 to 4800 IMCU per 100 kg of milk.

11. A low moisture mozzarella cheese obtained by the process of claim 1.

12. The cheese according to claim 11, wherein the cheese has a stretchability of at least 1000 mm after 30 days, wherein stretchability is assessed by placing the cheese in a well in a thermostatically controlled water bath at about 90° C. for about 10 minutes, thereby heating the cheese, pulling the heated cheese vertically, and measuring how much the heated cheese stretches before it breaks using a Filometer.

13. The cheese according to claim 11, wherein the cheese has a ratio of soluble nitrogen to total nitrogen (SN/TN) of at least 3.7 eight days after production.

* * * * *